(12) United States Patent
Yamawaki

(10) Patent No.: US 6,525,874 B2
(45) Date of Patent: Feb. 25, 2003

(54) INFRARED MICROSCOPE AND OBSERVATION TUBE USED FOR THE SAME

(75) Inventor: Yasuhiro Yamawaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/760,812

(22) Filed: Jan. 17, 2001

(65) Prior Publication Data

US 2001/0008460 A1 Jul. 19, 2001

(30) Foreign Application Priority Data

Jan. 18, 2000 (JP) .......................... 2000-013929

(51) Int. Cl.⁷ .............................. G02B 5/20; G02B 21/00
(52) U.S. Cl. ....................... 359/361; 359/350; 359/370; 359/385; 359/614
(58) Field of Search ................. 359/350–361, 359/368–390, 601, 608–614

(56) References Cited

U.S. PATENT DOCUMENTS

| 3,973,827 A | * | 8/1976 | Uetake ........................ 359/389 |
| 4,643,540 A | * | 2/1987 | Kawasaki et al. .......... 359/385 |
| 4,769,530 A | * | 9/1988 | Miyahara ..................... 359/380 |
| 5,239,409 A | * | 8/1993 | Doyle et al. ................. 359/351 |
| 5,966,204 A | * | 10/1999 | Abe ............................ 356/51 |
| 6,008,936 A | * | 12/1999 | Simon ......................... 359/370 |
| 6,222,187 B1 | * | 4/2001 | Shivanandan ............... 359/355 |
| 6,226,118 B1 | * | 5/2001 | Koyama et al. ............. 359/380 |

FOREIGN PATENT DOCUMENTS

JP   11-109247   4/1999

\* cited by examiner

*Primary Examiner*—Thong Nguyen
(74) *Attorney, Agent, or Firm*—Pillsbury Winthrop LLP

(57) ABSTRACT

An infrared microscope includes a light source emitting infrared light, an objective optical system forming an image of a specimen, and a path switching member switching an optical path from a visual observation optical path in which an infrared-light blocking member is placed, to another optical path to introduce light from the objective optical system thereinto. The infrared microscope is constructed so that an image which is free of aberration due to infrared light and has no unnatural hue due to a large amount of light with long wavelengths can be obtained without moving an element for blocking the infrared light.

22 Claims, 3 Drawing Sheets

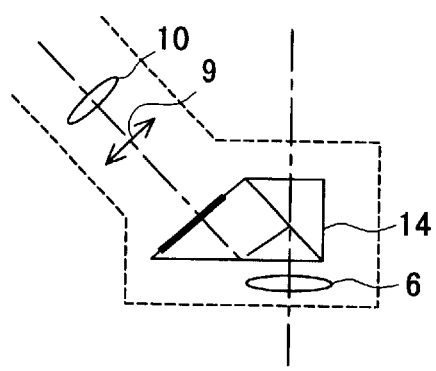
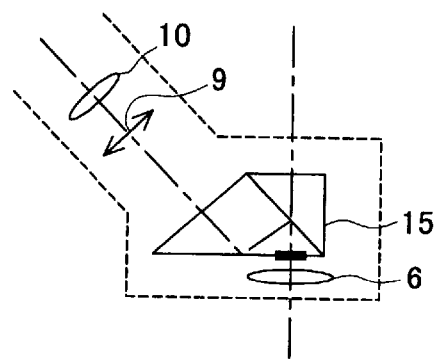
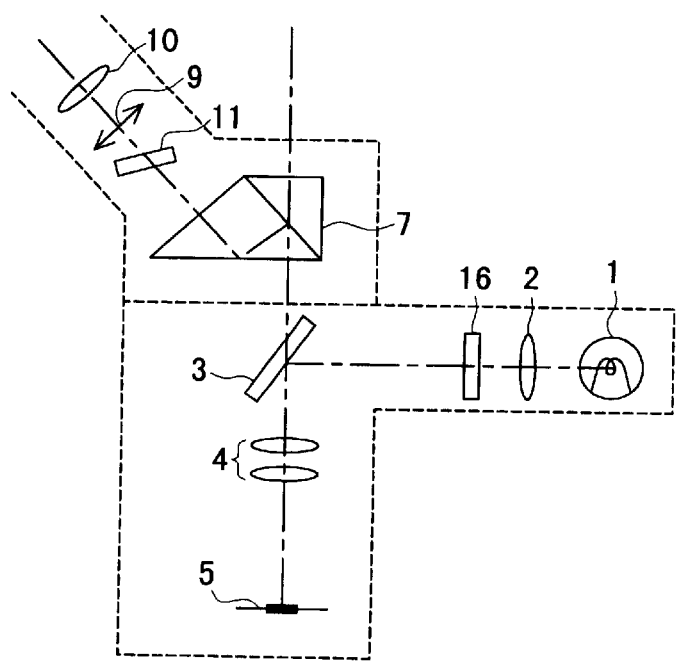

INFRARED MICROSCOPE AND OBSERVATION TUBE USED FOR THE SAME

BACKGROUND OF THE INVENTION

1. Field of the Invention

This invention relates to a microscope and, in particular, to an infrared microscope in which a visual observation can be made, and an observation tube used for this microscope.

2. Description of Related Art

Recently, an infrared microscope utilizing light in a near-infrared region has been used for the FCB inspection of the silicon substrate of a semiconductor and in a Raman spectroscope.

In an infrared observation under a conventional infrared microscope, infrared light with wavelengths up to 1300 nm has been generally used.

The conventional infrared microscope includes a light source which is capable of emitting infrared light with wavelengths up to about 1300 nm, for example, a halogen lamp which has high luminance in an infrared region, an illumination optical system for illuminating a specimen, an infinite objective lens in which aberration is corrected with respect to light ranging from a visible region to the infrared region (1300 nm), forming an image of the specimen, and a lens for forming an image of light from the objective lens. Moreover, the microscope has a visual observation optical path for making a visual observation of the specimen, an infrared observation optical path for making an infrared observation through a TV camera, provided to be independent of the visual observation optical path, a path switching prism for switching an optical path to one of the above two optical paths to introduce the light from the objective lens thereinto, and an eyepiece in which aberration is favorably corrected with respect to only light in the visible region.

The path switching prism is coated with a reflecting coating for reflecting all of light and is placed to be movable in and out of the optical path from the objective lens, or is half-coated so that light can be separated and introduce into the visual observation optical path and the infrared observation optical path at any ratio to carry out the infrared observation and the visual observation at the same time, and is disposed in the optical path from the objective lens.

An observation tube used in this infrared microscope includes an imaging lens for conducting the light from the objective lens and the path switching prism, having the visual observation optical path and the infrared observation optical path.

In such a conventional infrared microscope, when the path switching prism is disposed so that emergent light follows the visual observation optical path, the path switching prism reflects even near-infrared light (visible infrared light) which irradiates the specimen and is then reflected to pass through the objective lens, together with visible light, and introduces the light into the visual observation optical path. Consequently, an observer will carry out a visual observation of an image with visible light containing infrared light.

In the visual observation, however, an eyepiece is not favorably corrected for aberration with respect to near-infrared light, and thus the view of an image is impaired because of aberration produced by near-infrared light in a visible wavelength region. That is, the human eye is sensitive to light with wavelengths up to, 750–800 nm, depending on the individual.

However, since the wavelength region in which the eyepiece is favorably corrected for aberration is up to 700 nm and light with longer wavelengths yields aberration, the view of the image is impaired.

Furthermore, since the infrared observation is carried out by relatively increasing the intensity of light on the long-wavelength side, red light on the long-wavelength side becomes more intense than blue-purple light on the short-wavelength side, and an image under the visual observation has a reddish, unnatural hue, as a whole.

Thus, in order to eliminate the unfavorable view and the unnatural hue of the image of the visual observation, an element for blocking infrared light, for example, an IR cut-off filter or a color temperature compensating filter, is placed in the optical path of the illumination optical system only in the case of the visual observation. By doing so, infrared light with long wavelengths more than 700 nm, which is responsible for aberration due to infrared light and the unnatural hue of the image due to a large amount of light with long wavelengths, is blocked by the filter, and hence a favorable image can be obtained.

In this case, however, the problem arises that infrared light with wavelengths of 800–1300 nm required for the infrared observation is also blocked by the element for blocking infrared light and the specimen is not irradiated with infrared light. Therefore, when the infrared observation is carried out, the element for blocking infrared light must be removed from the optical path of an illumination system. This causes inconvenience to the operation of the microscope. Specifically, in the conventional infrared microscope, the specimen is irradiated with infrared light to observe the image of the specimen with the infrared light through a TV camera, and thus the element for blocking infrared light necessary for the observation cannot be fixed and placed in the optical path between the light source and the light-receiving surface of the TV camera. Moreover, when the infrared observation is carried out through the TV camera, aberration of light with longer wavelengths than the wavelength at which the objective lens is favorably corrected for aberration is produced, and light with wavelength at which the objective lens is not corrected for aberration is also received by the TV camera. This deteriorates the view of the image.

SUMMARY OF THE INVENTION

It is, therefore, an object of the present invention to provide an infrared microscope in which aberration due to infrared light is favorably corrected and an image which has no unnatural hue due to a large amount of light with long wavelengths can be obtained without moving the element for blocking infrared light in a visual observation, and an observation tube used for this microscope.

In order to achieve this object, the infrared microscope according to the present invention includes a light source emitting infrared light, an objective optical system for forming an image of a specimen, a first optical path for carrying out a visual observation of the image of the specimen, a second optical path provided to be independent of the first optical path, a path switching member located at a position where the first optical path intersects with the second optical path, a driving mechanism for moving the path switching member, and an infrared-light blocking member placed in the first optical path.

The observation tube used for the infrared microscope according to the present invention includes a first optical path for carrying out a visual observation of an image of a specimen formed by an objective optical system, a second optical path provided to be independent of the first optical path, a path switching member located at the position where the first optical path intersects with the second optical path, a driving mechanism for moving the path switching member, and an infrared-light blocking member placed in the first optical path.

According to the present invention, the first optical path is provided with an eyepiece.

According to the infrared microscope of the present invention, an image which is free of aberration due to infrared light and has no unnatural hue due to a large amount of light with long wavelengths can be obtained without moving the element for blocking the infrared light in a visual observation. Furthermore, even in the infrared observation, an image which is free of aberration can be obtained with respect to light with longer wavelengths than the wavelength at which the objective lens is corrected for aberration, and a favorable observation can be always carried out.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 5 is a view showing schematically the construction of the observation tube in a fifth embodiment of the infrared microscope according to the present invention;

FIG. 6 is a view showing schematically the construction of the observation tube in a sixth embodiment of the infrared microscope according to the present invention; and FIG. 7 is a view showing schematically the construction of a microscope body and the observation tube in a seventh embodiment of the infrared microscope according to the present invention.

DETAILED DESCRIPTION OF THE PREFERRED EMBODIMENTS

In accordance with the drawings, various embodiments of the present invention will be described in detail below.

First Embodiment

Figure 1A:
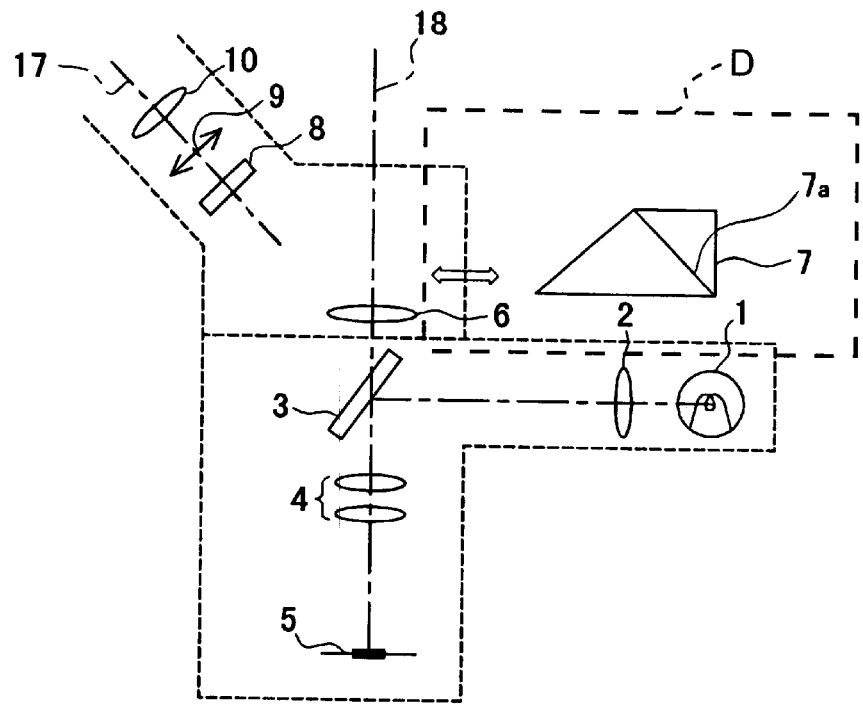
FIG. 1(A) is a view showing schematically the construction where a path switching prism is removed from an observation optical path in a first embodiment of the infrared microscope according to the present invention.
Figure 1B:
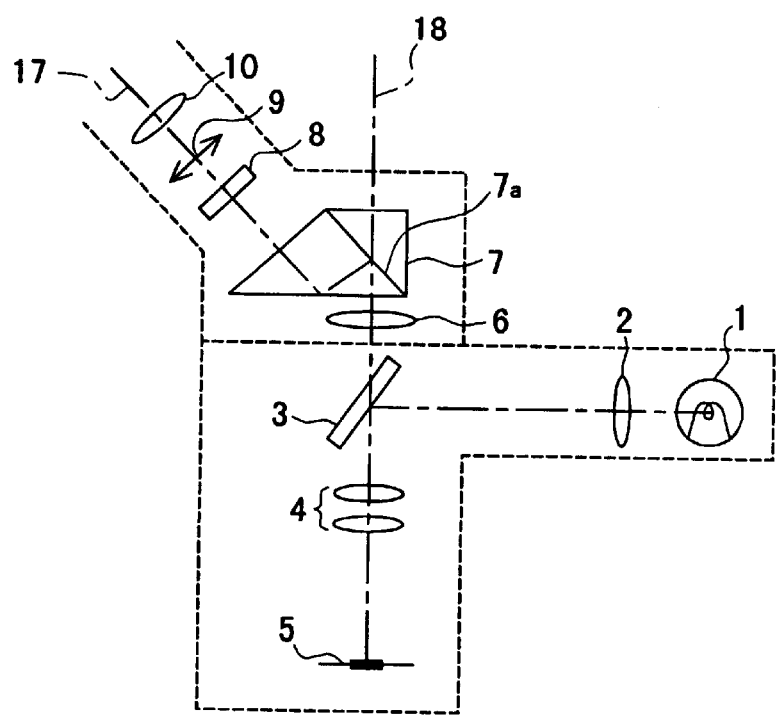
FIG. 1(B) is a view showing schematically the construction where the path switching prism is inserted into the observation optical path in the first embodiment.

FIGS. 1(A) and 1(B) show the first embodiment of the infrared microscope according to the present invention. In the infrared microscope of this embodiment, an IR cut-off filter 8 is interposed in the visual observation optical path between a path switching prism 7 and an eyepiece 10. In FIGS. 1(A) and 1(B), reference numeral 1 represents a light source, 2 represents an illumination optical system, 3 represents a half mirror, 4 represents an objective lens, 5 represents a specimen, 6 represents an imaging lens, D represents a driving mechanism for moving path switching member 7, and 9 represents a specimen image.

In the infrared microscope of the first embodiment, illumination light emitted from the light source 1, containing white light and infrared light, passes through the illumination optical system 2 and is incident on the half mirror 3. The light reflected by the half mirror 3 irradiates the specimen 5 through the objective lens 4. The light reflected from the specimen 5, after being changed to a parallel beam by the objective lens 4 and emerging therefrom, is incident through the half mirror 3 and the imaging lens 6 on the path switching prism 7. The path switching prism 7 is constructed so that an interface 7a between two prisms is coated with a coating material for reflecting all of incident light. As shown in FIG. 1(A), when the prism 7 is removed from the optical path of the objective lens 4, the light from the specimen 5 is introduced through the imaging lens 6 into an infrared observation optical path 18, while as shown in FIG. 1(B), when the prism 7 is inserted into the optical path of the objective lens 4, the light is introduced into a visual observation optical path 17. When the path switching prism 7 is removed from the optical path of the objective lens, that is, when the optical path is switched to introduce the light into the infrared observation optical path, the light from the specimen 5 passing through the imaging lens 6 is imaged on the light-receiving surface of the TV camera (not shown) as it is. On the other hand, when the path switching prism 7 is placed in the optical path, that is, when the optical path is switched to introduce the light into the visual observation optical path, the light from the specimen passing through the imaging lens 6, after being reflected by the interface 7a of the path switching prism 7, is incident on the IR cutoff filter 8 so that infrared light with longer wavelengths than 700 nm is absorbed through the IR cutoff filter 8 and the specimen image 9 is formed with light of other wavelengths.

The IR cutoff filter 8 is provided on the visual observation optical path 17 to block light with long wavelengths more than 700 nm, which is responsible for an unfavorable view of the image due to aberration and an unnatural hue due to the high intensity of infrared light, so that when the visual observation is made, a good image of proper color balance can be observed. The IR cutoff filter 8 is a member of 2 mm in thickness, for instance, and its spectral transmittance characteristics are less than 80% at 700 nm and less than 50% at 800 nm for a filter that absorbs infrared light, while the transmittance at 400–600 nm in the visible region is more than 90% so that infrared light is blocked through the IR cutoff filter 8, and the unfavorable view and the unnatural hue of the image is obviated.

Since the IR cutoff filter 8 absorbs infrared light, there is no fear that flare is produced by reflection. Moreover, the IR cutoff filter 8 is such that, by changing its thickness, the transmittance characteristics can be easily varied. Also, the specimen image 9 having been formed is magnified and observed through the eyepiece 10.

Where the infrared observation is carried out, it is only necessary to remove the path switching prism 7 from the optical path and to switch the visual observation optical path to the infrared observation optical path. By doing so, a good infrared observation can be achieved, and there is no need to remove the IR cutoff filter 8.

Thus, according to the infrared microscope of the first embodiment, an image which is free of aberration due to infrared light and has no unnatural hue due to a large amount of light with long wavelengths can be obtained, without moving the IR cutoff filter 8 which is the element for blocking the infrared light, in the visual observation of the infrared microscope.

Second Embodiment

Figure 2:
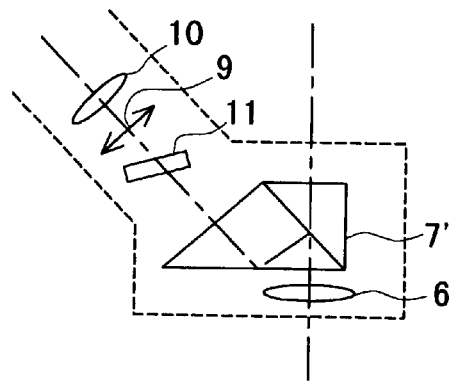
FIG. 2 is a view showing schematically the construction of the observation tube in a second embodiment of the infrared microscope according to the present invention.

FIG. 2 shows the construction of the observation tube of the second embodiment in the present invention. The observation tube of this embodiment is constructed so that a plane-parallel plate 11 whose entrance surface is coated with an infrared reflecting film is placed on the visual observation optical path between a path switching prism 7' and the eyepiece 10 and is inclined with respect to incident light. In this way, it is avoidable that reflected infrared light is reflected by the surface of the path switching prism 7'. to produce flare. At the same time, infrared light with long wavelengths more than 700 nm is reflected by the infrared reflecting film and thereby the infrared light is blocked. Also, a white plate is used as the material of the plane-parallel plate 11.

The spectral transmittance characteristics of the infrared reflecting film with which the plane-parallel plate 11 of the second embodiment is coated are, for example, less than 50% at 750 nm and less then 5% at 800 nm, while the transmittance at 450–600 nm in the visible region is more than 90% so that the infrared light is blocked by the infrared reflecting film, and the unfavorable view and the unnatural hue of the image is obviated.

In the observation tube of the second embodiment, a prism which is half-coated to separate light into the visual observation optical path and the infrared observation optical path with the ratio of 20:80 is used as the path switching prism 7' of the tube. Thus, the light from the imaging lens 6 is separated and introduced through the path switching prism 7' into the visual observation optical path and the infrared observation optical path so that the visual observation and the infrared observation can be carried out simultaneously.

Third Embodiment

Figure 3:
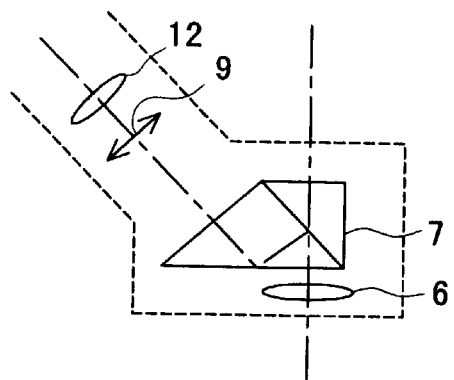
FIG. 3 is a view showing schematically the construction of the observation tube in a third embodiment of the infrared microscope according to the present invention.

FIG. 3 shows the construction of the observation tube of the third embodiment in the present invention. In the observation tube of this embodiment, an eyepiece 12 is coated with the infrared reflecting film, and the infrared light with long wavelengths more than 700 nm is reflected by the infrared reflecting film with which the entrance surface of the eyepiece 12 is coated. Whereby, the infrared light passing through the visual observation optical path is blocked or attenuated.

Fourth Embodiment

Figure 4:
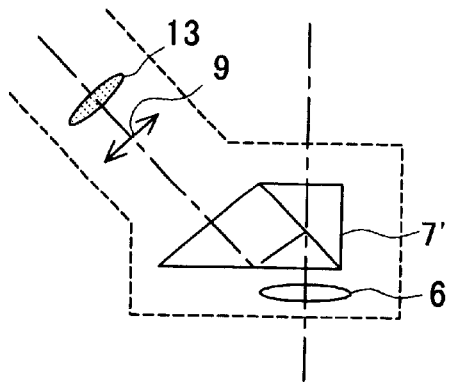
FIG. 4 is a view showing schematically the construction of the observation tube in a fourth embodiment of the infrared microscope according to the present invention.

FIG. 4 shows the construction of the observation tube of the fourth embodiment in the present invention. In the observation tube of this embodiment, an eyepiece 13 is made with a material that absorbs infrared light, for example, a material identical with that used for the IR cutoff filter. The infrared light with long wavelengths more than 700 nm is absorbed by the eyepiece 13 made with the material that absorbs infrared light, and thereby the infrared light is blocked.

Fifth Embodiment

FIG. 5 shows the construction of the observation tube of the fifth embodiment in the present invention. In the observation tube of this embodiment, a path switching prism 14 is such that the exit surface thereof is coated with the infrared reflecting film. The infrared light with long wavelengths more than 700 nm is reflected by the infrared reflecting film with which the exit surface of the path switching prism 14 is coated, and thereby the infrared light passing through the visual observation optical path is blocked or attenuated.

Sixth Embodiment

FIG. 6 shows the construction of the observation tube of the sixth embodiment in the present invention. In the observation tube of this embodiment, the entrance surface of a path switching prism 15 is coated with the infrared reflecting film, and the infrared light with long wavelengths more than 700 nm is reflected by the infrared reflecting film with which the entrance surface of the path switching prism 15 is coated. Whereby, the infrared light passing through the visual observation optical path is blocked or attenuated.

Seventh Embodiment

FIG. 7 shows the seventh embodiment of the present invention. In this embodiment, the infrared microscope is constructed with the microscope body and the observation tube. The element 11 coated with the infrared reflecting film is placed in the visual observation optical path of the observation tube, and a filter 16 that blocks infrared light is disposed in the optical path of the illumination system of the microscope body.

Specifically, in the infrared microscope of the seventh embodiment, the plane-parallel plate coated with the film that blocks infrared light is placed, as the element 11 coated with the infrared reflecting film, inside the observation tube of the second embodiment. By doing so, the production of aberration and the unnatural hue of an image due to the light with long wavelengths more than 700 nm are obviated and the view of the image under the visual observation is improved.

Also, in the infrared observation, the objective lens is favorably corrected for aberration with respect to light with wavelengths of 500–1300 nm, but aberration is produced for light with long wavelengths more than 1300 nm.

Thus, the filter 16 that blocks light lying on the long-wavelength side of an aberration-correction wavelength region of the objective lens, namely light with long wavelengths more than 1300 nm in the above case, is disposed in the illumination system. Whereby, the production of aberration due to light with long wavelengths more than 1300 nm is prevented, and the view of the image under the infrared observation is improved.

Also, the infrared microscope of the seventh embodiment has a finite optical system, and the imaging lens is not provided in the observation tube.

What is claimed is:

1. An infrared microscope comprising:

a light source emitting visible light and infrared light;

an objective optical system constructed and arranged to form an image of a specimen;

a first optical path for carrying out a visual observation of said image of said specimen;

a second optical path provided to be independent of said first optical path;

a path switching member located at a position where said first optical path intersects with said second optical path;

a driving mechanism constructed and arranged to move said path switching member; and an infrared-light blocking member placed in said first optical path, wherein said infrared-light blocking member is an absorption type optical member whose spectral transmittance is larger at a wavelength range of 400 nm to 600 nm than at a wavelength of 700 nm and at a wavelength of 800 nm.

2. An infrared microscope comprising:

a light source emitting visible light and infrared light;

an objective optical system for forming an image of a specimen;

a first optical path constructed and arranged to carry out a visual observation of said image of said specimen;

a second optical path provided to be independent of said first optical path;

a path switching member located at a position where said first optical path intersects with said second optical path;

a driving mechanism constructed and arranged to move said path switching member; and an infrared-light blocking member placed in said first optical path, wherein said infrared-light blocking member is a reflection type optical member whose spectral transmittance is larger at a wavelength range of 450 nm to 600 nm than at a wavelength of 750 nm and at a wavelength of 800 nm.

3. An infrared microscope according to claim 1, wherein said illumination system is adapted to accept another infrared-light blocking member that is used for infrared observation and has different characteristics from the infrared-light blocking member placed in said first optical path.

4. An infrared microscope according to claim 1, 2 or 3, wherein said first optical path is provided with an eyepiece and said infrared-light blocking member is interposed between said path switching member and said eyepiece.

5. An infrared microscope according to claim 2 or 3, wherein said infrared-light blocking member is a reflection type optical filter and is inclined with respect to an optical axis of said first optical path.

6. An infrared microscope according to claim 1 or 3, wherein said first optical path is provided with an eyepiece and said infrared-light blocking member is an absorption type optical material, said optical material being used as a lens constituting said eyepiece.

7. An infrared microscope according to claim 2 or 3, wherein said first optical path is provided with an eyepiece and said infrared-light blocking member is a reflection type optical film, said optical film being provided on a surface of a lens constituting said eyepiece.

8. An infrared microscope according to claim 2 or 3, wherein said infrared-light blocking member is a reflection type optical film, said optical film being arranged on at least one of an entrance surface and an exit surface of said path switching member.

9. An infrared microscope according to claim 3, wherein said another infrared-light blocking member is a filter blocking light in a wavelength region greater than 1300 nm.

10. An infrared microscope according to claim 1, wherein said infrared-light blocking member has a spectral transmittance of more than 90% at a wavelength range of 400 nm to 600 nm, less than 80% at a wavelength of 700 nm and less than 50% at a wavelength of 800 nm.

11. An infrared microscope according to claim 2, wherein said infrared-light blocking member has a spectral transmittance of more than 90% at a wavelength range of 450 nm to 600 nm, less than 50% at a wavelength of 750 nm, and less than 5% at a wavelength of 800 nm.

12. An infrared microscope according to claim 2, wherein said illumination system is adapted to accept another infrared-light blocking member that is used for infrared observation and has different characteristics from the infrared-light blocking member placed in said first optical path.

13. A tube for an infrared microscope, comprising:

a first optical path constructed and arranged to permit carrying out a visual observation of an image of a specimen formed by an objective optical system, a second optical path provided to be independent of said first optical path;

a path switching member located at a position where said first optical path intersects with said second optical path;

a driving mechanism constructed and arranged to move said path switching member; and an infrared-light blocking member placed in said first optical path, wherein said infrared-light blocking member is an absorption type optical member whose spectral transmittance is larger at a wavelength range of 400 nm to 600 nm than at a wavelength of 700 nm and larger than at a wavelength of 800 nm.

14. A tube for an infrared microscope, comprising:

a first optical path constructed and arranged to permit carrying out a visual observation of an image of a specimen formed by an objective optical system, a second optical path provided to be independent of said first optical path;

a path switching member located at a position where said first optical path intersects with said second optical path;

a driving mechanism constructed and arranged to move said path switching member; and an infrared-light blocking member placed in said first optical path, wherein said infrared-light blocking member is a reflection type optical member whose spectral transmittance is larger at a wavelength range of 450 nm to 600 nm than at a wavelength of 750 nm and at a wavelength of 800 nm.

15. A tube for an infrared microscope according to claim 13 or 14, wherein said first optical path is provided with an eyepiece and said infrared-light blocking member is interposed between said path switching member and said eyepiece.

16. A tube for an infrared microscope according to claim 15, wherein said infrared-light blocking member is a reflection type optical filter and is inclined with respect to an optical axis of said first optical path.

17. A tube for an infrared microscope according to claim 15, wherein said first optical path is provided with an eyepiece and said infrared-light blocking member is an absorption type optical material, said optical material being used as a lens constituting said eyepiece.

18. A tube for an infrared microscope according to claim 13 or 14, wherein said first optical path is provided with an eyepiece and said infrared-light blocking member is a reflection type optical film, said optical film being provided on a surface of a lens constituting said eyepiece.

19. A tube for an infrared microscope according to claim 13 or 14, wherein said infrared-light blocking member is a reflection type optical film, said optical film being arranged on at least one of an entrance surface and an exit surface of said path switching member.

20. A tube for an infrared microscope according to claim 13, wherein said infrared-light blocking member has a spectral transmittance of more than 90% at a wavelength range of 400 nm to 600 nm, less than 80% at a wavelength of 700 nm, and less than 50% at a wavelength of 800 nm.

21. A tube for an infrared microscope according to claim 14, wherein said infrared-light blocking member has a spectral transmittance of more than 90% at a wavelength range of 450 nm to 600 nm, less than 50% at a wavelength of 750 nm, and less than 5% at a wavelength of 800 nm.

22. A tube for an infrared microscope according to claim 14, wherein said infrared-light blocking member is a reflection type optical filter and is inclined with respect to an optical axis of said first optical path.

* * * * *